J. B. DAVIS.
PISTON.
APPLICATION FILED OCT. 3, 1919.
1,347,082.
Patented July 20, 1920.
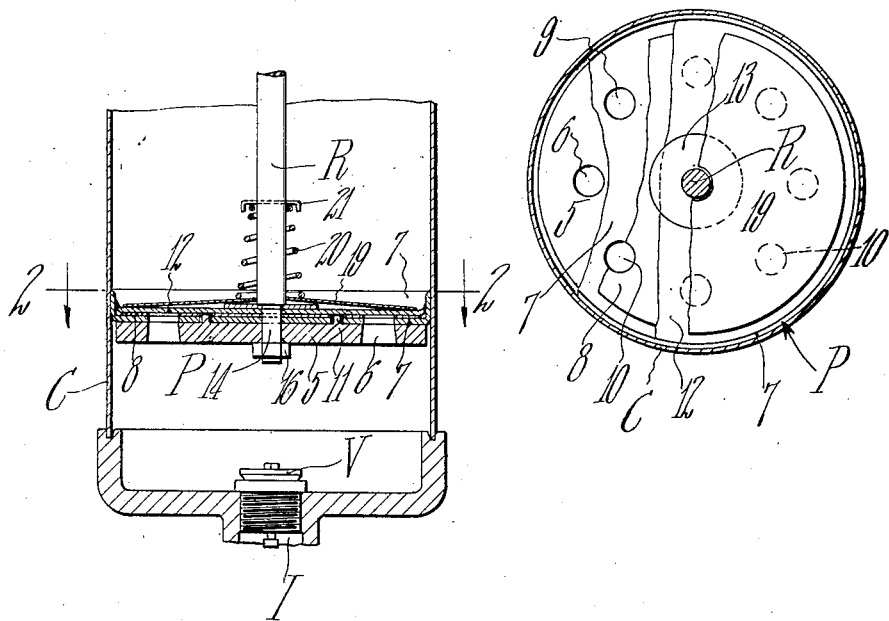
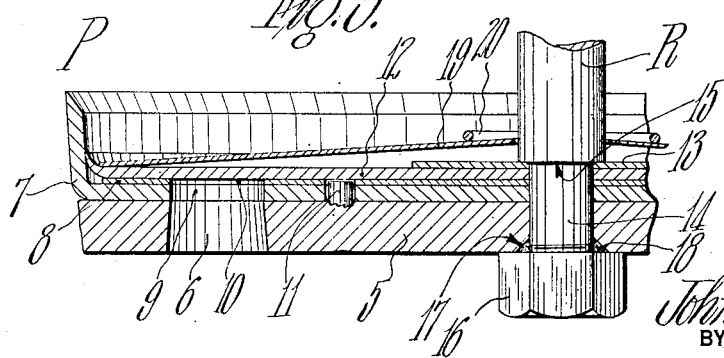
INVENTOR
John B. Davis.
BY Chapin & Neal
ATTORNEYS.

UNITED STATES PATENT OFFICE.

JOHN B. DAVIS, OF SPRINGFIELD, MASSACHUSETTS, ASSIGNOR TO GILBERT & BARKER MANUFACTURING COMPANY, OF WEST SPRINGFIELD, MASSACHUSETTS, A CORPORATION OF MASSACHUSETTS.

PISTON.

1,347,082.    Specification of Letters Patent.    Patented July 20, 1920.

Application filed October 3, 1919. Serial No. 328,270.

*To all whom it may concern:*

Be it known that I, JOHN B. DAVIS, a citizen of the United States of America, residing at Springfield, in the county of Hampden and State of Massachusetts, have invented certain new and useful Improvements in Pistons, of which the following is a specification.

This invention relates to pistons and, more particularly, to improvements in pistons of the type which includes a valve-controlled passage therethrough.

Generally, the so-called valved piston is provided with a carefully fitted and accurately machined valve and seat. Such construction is expensive to manufacture due to the many machining operations necessary, such as the turning of the valve, its stem, and seat, and the turning and threading of the exterior of the valve seat and the boring and threading of the piston body to receive the threaded seat. Not only are such valves expensive to manufacture, but they also require attention from time to time to maintain them in proper working condition. For example, they must be refitted and ground from time to time to compensate for wear. Such valves are also open to the objection that they fail to tightly close when particles of dust, or other foreign matter, lodge between the valve and seat.

This invention is concerned with the provision of a piston with an improved type of valve, which is comparatively simple in construction and relatively inexpensive to manufacture due largely to the elimination of the necessity for the careful fitting of parts and the substantial reduction in machining operations, over valves of the metallic type. Valved pistons, in which non-metallic valves are utilized, have been provided heretofore and two examples of such pistons will be found in my prior U. S. Patents Nos. 1,275,866 and 1,302,014, granted August 13, 1918, and April 29, 1919, respectively. The valves in the pistons of my prior patents, however, depend upon the flexible member or packing of the piston itself and this packing must needs perform two functions. While this can be, and has been, done, it is difficult to so design the packing as to perform each function with the desired degree of efficiency. For example, the one packing, where used for both valve and piston, tends to act somewhat like a diaphragm and, in practical effect, may cause less than the theoretical amount to be delivered from a given stroke of the pump.

According to this invention, the valve action is obtained by providing a flexible packing member independent of the piston packing, which member overlies one or more openings in the piston and its packing and is yieldingly held thereto. On the suction stroke of the piston, the flexible valve member is tightly held to its seat by the suction created and by the weight of liquid upon it and, being flexible, readily conforms to various small irregularities in the seat, so that the latter does not need to be carefully machined. On the opposite stroke of the piston, the flexible valve member readily yields to permit the passage of liquid through the openings and between it and the piston packing.

According to another feature of the invention, the piston packing is made in cupped form and the flexible valve member is fitted within the cupped packing, also in slightly cupped form, whereby the flexible valve member may closely fit and seat on the internal periphery of the cupped piston packing, as well as against the flat face of such packing so that a double seal is obtained when the valve member is in closed position. In addition, the engagement of the flexible valve member with the internal periphery of the cupped piston packing tends to force the circumferential wall of the latter tightly against the cylinder walls and thus aids the piston packing in more efficiently performing its intended function and renders useless the springs or equivalent means frequently employed heretofore for a like purpose.

According to another feature of the invention, means are provided to keep the flexible valve member tightly stretched across the piston openings when in closed position.

According to another feature of the invention, a valved piston of specifically improved construction is provided.

Other features and advantages will appear in the following description and in the illustrative embodiment of the invention in the accompanying drawings, in which:

Figure 1 is a fragmentary sectional elevational view of a cylinder showing therein a piston embodying the invention;

Fig. 2 is a sectional plan view taken on line 2—2 of Fig. 1, various parts of the piston being successively broken away to reveal other parts therebeneath; and Fig. 3 is an enlarged fragmentary sectional elevational view of the piston.

Referring to these drawings; C represents conventionally a cylinder, of any suitable construction, which is provided with an inlet I, and a valve V. The latter is normally held to its seat by gravity to close inlet I, but is movable away from its seat by the suction created in cylinder C to open inlet I, all in the usual manner. P represents the piston generally and R the piston rod. The piston P is adapted on its upstroke to create a partial vacuum in the lower part of cylinder C, lift valve V, and draw in a charge of fluid, which on a downstroke of the piston passes therethrough to be subsequently delivered on the next upstroke of piston P. For this purpose, a valve must be provided in the piston to permit the passage of fluid under the conditions described. While valved pistons have been provided heretofore, this invention is characterized by an improved type of piston wherein the valve action is obtained by simple and relatively inexpensive means.

The piston P includes a circular body member 5, which is provided with a series of holes therethrough. This member 5 is made of such diameter as to merely loosely fit the cylinder C and therefore, since an accurate fit is not required, the member 5 may be produced simply and inexpensively, as by a casting operation, the periphery of the member and the walls of the holes 6 therein being tapered to permit formation of the member in this manner. Superposed concentrically on member 5 is cupped packing 7, preferably of leather or like material, which packing closely fits the walls of cylinder C to prevent leakage of fluid past the loosely fitting member 5. A flat, thin, circular disk 8, preferably of metal, is superposed upon the packing 7 and this disk holds the piston packing 7 flatly against the body 5 and prevents it from acting like a diaphragm. Both the packing and disk have holes 9 and 10, respectively, therein to register with the holes 6 in number 5. One or more studs 11, on the latter, extend through suitable openings in the packing 7 and disk 8 to insure registration of the holes 6, 9, and 10.

Applied concentrically upon the apertured disk 8 is a second packing 12, which normally covers and closes the holes 10, but which may, as will appear, yield to permit flow of liquid thereby. The packing 12 therefore functions as a valve. The packing 12 is slightly larger in diameter than the internal diameter of the cupped packing 7, so that it fits within the latter in slightly cupped form, and its outer circumference is skived, as indicated, so that it will conform to and closely fit the interior surface of the cupped portions of packing 7. A thin, flat, circular disk 13, preferably of metal, is applied upon the packing 12 and such disk is of relatively small diameter and covers merely a small central area of the packing, functioning as a washer. The members 4, 7, 8, 12, and 13 are provided with suitable central holes therethrough to receive the necked-down lower end 14 of piston rod R, a shoulder 15 of which engages the disk 13. A nut 16 is threaded upon the lower end of the necked-down portion 14 and is adapted to engage the under face of member 5, whereby the members 5, 7, 8, 12 and 13 may be firmly clamped together at their central portions. Preferably, the central, piston rod receiving, opening in member 5 is countersunk, as at 17, to receive a packing 18, which is jammed in place by nut 16 to insure against leakage of fluid between the member 5 and piston rod R.

Loosely applied over the rod R is member 19, herein shown as a circular disk 19, which may be somewhat resilient, although a yielding of this disk is not relied upon for proper valve action. The disk 19 is slightly dished so that only its outer circumferential portion bears upon the packing adjacent the outer circumference of the latter. A spring 20, preferably of the conical type, as illustrated, is then slipped over rod R and acts between a pin 21 on the rod and the member 19 to yieldingly hold the member 19 against the packing 12. The spring 20, alone, permits the necessary yield of member 12 and the disk 19, by reason of its dished shape, acts to stretch the member 12 tightly across the openings and to hold it flatly against disk 8.

In operation, on an upstroke of piston P, the flexible valve member 12 is held tightly seated against the face of the disk 8 by the weight of the liquid imposed thereupon and by the suction created in the cylinder below the piston. In addition, the same forces, which tend to tightly force the member 12 against the disk 8, act with equal efficiency to force the thin, and preferably skived, circumferential edge of the member against the internal surface of the circumferential wall of the cupped piston packing 7. Thereby, a second seat is provided for the valve member and the latter then provides a double seal for the piston openings on the suction stroke of the piston. On such stroke, and at a time when it is most important that the piston packing closely fit the walls of cylinder C, the pressure of the flexible valve member 12 against the circumferential wall of the piston packing tends to force such wall into intimate contact with the cylinder wall and thereby aids the piston packing 7 in the performance of its intended function.

On a reverse stroke of piston P, the latter is forced downwardly through a column of liquid, and the member 12 yields upwardly to permit the liquid to pass from the piston openings and between the member and the piston packing 7. In this connection, the dish-shaped disk 19 will move bodily upwardly against the force of spring 20. Thus, a material amount of movement of the member 12 is permitted and this, with the many piston openings provided, permits rapid passage of the liquid through the piston.

It is to be noted that the valved piston structure described is particularly suitable for quantity production at comparatively low cost. The piston body 5 is merely a simple casting which requires merely boring for the piston rod R. The packings 7 and 12, usually of leather, are readily formed in quantities with great rapidity by simple operations. The disks 8, 13, and 15 are preferably formed of sheet metal and can be produced in quantities, at low cost, by stamping operations.

Thus, I have provided a generally improved valved piston structure which is particularly characterized by its simplicity of construction, its relative inexpensiveness of manufacture, and by its efficiency in operation.

It is recognized that modifications may be made in the structure herein described for illustrative purposes without departing from the scope of the invention, which is defined by the appended claims rather than by the foregoing description.

What I claim is—

1. A piston, comprising, a body, a piston packing, communicating openings through said body and packing, a flexible member to overlie and close said openings, a dish-shaped disk superposed on said member and yieldable means to force said disk against said member and hold the latter in closed position.

2. A piston, comprising, a body provided with openings therethrough, a flexible member overlying said openings to close the latter, and yieldable means to hold said member in closed position, such means including parts engageable with said member near its outer portions to hold the member stretched across said openings.

3. A piston, comprising, a body to loosely fit the cylinder wall, a cupped packing held to the body and affording an annular rim designed to closely fit said wall, communicating openings provided through the body and packing, and a flexible circular member held in overlying relation to said openings and capable of yielding away from said packing to permit the passage of fluid from said openings, said member being greater in diameter than the interior of said cupped packing so as to fit within the latter in slightly cupped form.

4. A piston, comprising, a body, a piston packing superposed thereon, a disk superposed upon the packing; said body packing and disk having communicating openings therethrough; a disk of flexible packing material superposed on the first-named disk to close said openings and clamped centrally together with said packing and first-named disk to the body, a disk of dish-shaped cross-section superposed on the flexible disk, and means to yieldingly force the dish-shaped disk against the outer circumferential portions of the flexible disk.

5. A piston, comprising, a circular body, a cupped piston packing applied face to face on the body with its circumferential portion extending away from the body, a circular member imposed face to face on said packing to prevent flexure of the face portion of the latter, communicating openings through said body, packing and member, a circular flexible valve member mounted face to face against the first-named member to close the openings therein, a piston rod by means of which said body, packing and both members are clamped together in face to face relation, a disk of dish-shaped cross-section slidable on said rod and bearing against the valve member near its periphery, and yieldable means to force the disk against the valve member, the latter being greater in diameter than the interior of the circumferential portion of the piston packing to fit within the latter in slightly cupped form.

6. A piston, comprising, a circular body, a piston packing applied face to face on the body, a circular member imposed face to face on said packing to prevent flexure of the latter, communicating openings through said body, packing and member, a circular flexible valve member mounted face to face against the first-named member to close the openings therein, a piston rod by means of which said body, packing and both members are clamped together in face to face relation, a disk of dish-shaped cross-section slidable on said rod and bearing against the valve member near its periphery, and yieldable means to force the disk against the valve member.

JOHN B. DAVIS.